Sept. 1, 1964     J. L. FRIEMEL ETAL     3,146,833
AUTOMATIC MARKING DEVICE

Filed March 4, 1963                                                 4 Sheets-Sheet 1

J.L. FRIEMEL
R.J. FRIEMEL
INVENTORS

BY

*Ely Silverman*

ATTORNEY

United States Patent Office 3,146,833
Patented Sept. 1, 1964

3,146,833
AUTOMATIC MARKING DEVICE
Jerome Louis Friemel and Roman Joseph Friemel,
both of Rte. 4, Hereford, Tex.
Filed Mar. 4, 1963, Ser. No. 262,530
8 Claims. (Cl. 172—126)

This invention relates to automatic marking devices used in the orientation of tractors and other implements during plowing and other soil treatments.

One object of this invention is to make a marking device support system and apparatus which is simple, automatic and reliable in the field.

Another object of this invention is to provide a marking device support system and apparatus which permits the markers to be held in the vertical position during turning.

Another object of this invention is to provide markers which will, on turning of a tractor supporting said markers, alternately operate one of said markers on the left or on the right side of the tractor.

Another object of this invention is to provide a marking device performing the above-described objects and also readily and reliably attachable to a standard tractor and implements used therewith and requiring only one hydraulic cylinder.

A further object of this invention is to provide a structure extremely reliable and economic in construction and readily maintained, providing for alternate operation of soil treating means on either side of a tractor and with a stable intermediate position.

Yet another object of this invention is to provide a control sub-assembly structure, extremely reliable and economic in construction and readily maintained, for providing for alternately operating or actuating devices on one or the other side thereof and with a stable intermediate position.

Further objects of this invention will be apparent to those skilled in the art on study of the below description of the apparatus and system of which description the hereto attached drawings form a part and in which drawings the same numbers refer and apply to the same parts throughout all said drawings and in which drawings.

Figure 1:
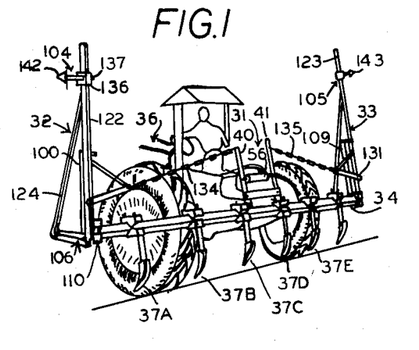
FIGURE 1 is a perspective overall view of the device of this invention operatively assembled on a tractor as seen from its rear and showing the central sub-assembly and the peripheral marking sub-assemblies.
Figure 2:
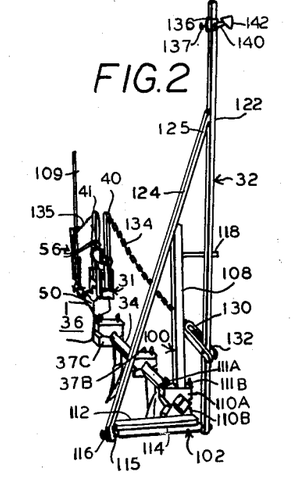
FIGURE 2 is a perspective view of one marking sub-assembly of FIGURE 1.

The device shown in FIGURE 1 generally comprises a central control sub-assembly 31, a left-hand marking sub-assembly 32 and a right hand marking sub-assembly 33. The sub-assemblies 31, 32 and 33 are all firmly attached to the conventionally upwardly and downwardly movable tool bar 34 of a tractor 36. Earth working tools as 37A, 37B, 37C, 37D, 37E are attached to the bar 34 by conventional means.

Figure 3:
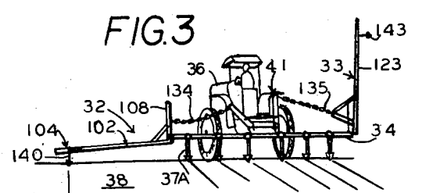
FIGURE 3 is an overall rear view of the operatively assembled apparatus of FIGURE 1 with the left side marking sub-assembly in operative position.
Figure 4:
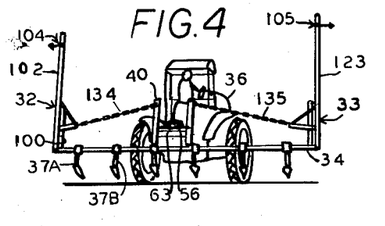
FIGURE 4 is an overall rear view of the apparatus of FIGURE 3 with both left and right side marking assemblies in neutral position.
Figure 5:
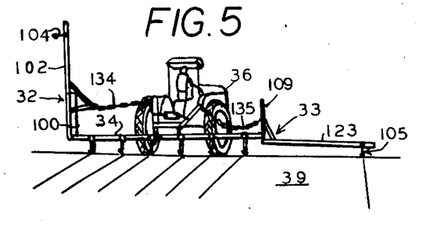
FIGURE 5 is an overall rear view of the apparatus of FIGURE 1 with the right side marking sub-assembly in operative position.

The positions of the marking sub-assemblies 32 and 33 are controlled by the central control sub-assembly 31. The sub-assembly 31 is operatively connected to sub-assemblies 32 and 33 by chains 134 and 135, respectively, and thereby serves to move the sub-assemblies 32 and 33 to and from their positions for marking the ground 38 on the left side of the tractor as shown in FIGURE 3, to and from their neutral positions as shown in FIGURES 1 and 4 and to and from their positions for marking the ground 39 on the right side of the tractor as shown in FIGURE 5.

The central control sub-assembly apparatus 31 comprises a base sub-assembly 50, left and right control arm sub-assemblies 52 and 54, latch arms 70 and 71, a cam sub-assembly 80 and a hydraulic control sub-assembly 56.

The left and right control arm sub-assemblies 52 and 54 comprise control arms, 40 and 41, respectively, each pivotally attached to the base 50. The hydraulic control sub-assembly, 56, is pivotally attached at its left and right ends to the control arms 40 and 41 of the sub-assemblies 52 and 54, respectively. The latch arms 70 and 71 are also pivotally attached to the arms 40 and 41, respectively, and are operated on by and also operate on the cam sub-assembly, 80, as below described.

The base 50 comprises supports, 60 and 61, and the bridge sub-assembly 63 between and firmly connecting said supports. Support 60 comprises a vertically extending front angle 60A and a rear angle 60B parallel to it and spaced therefrom by 1¾". Angles 60A and 60B are welded at their bottoms to a steel foot angle 44, and at their top to a trapezoidal flat steel head piece 44A. Support 61 is correspondingly formed of angles 61A, 61B, and 45 and plate 45A, similarly welded together. Except for the position of the latch arms 70 and 71 and cam shaft 84 and its cams below described, the left and right halves of the base sub-assembly 50 are symmetrical about the vertical center plane halfway between supports 60 and 61 through which plane the longitudinal axis of the cylindrical shaft 84 of the cam sub-assembly 80 passes. The cylindrical bearings in angles 65 and 66 for the straight cam shaft 84 also have their central axes located in that vertical plane.

The bridge sub-assembly 63 comprises, in the preferred embodiment herein described, two horizontal parallel spaced apart rigid support steel angles 65 and 66.

In the preferred embodiment, items 65 and 66 are each formed of 2" x 1½" steel angles, 3/16" thick and 23½" long. The 2" surfaces are vertical and face outward and the 1½" surfaces form the top surfaces of these angles. One end of each of these angles, as 65, is butt welded to the 1½" vertical side of the foot support elements, as angles 60A and 61A. The foot support elements 60A, 60B, 61A and 61B are each 2" x 1½" x 3/16" steel angles, each 9" long. Bases 44 and 45 are each formed of 2" x 2" x ¼" steel angles and head pieces 44A and 45A are ¼" x 1½" horizontal steel plates, all 6" long and are welded to the 1½" sides of angles 60A and 60B (for pieces 44 and 44A) and angles 61A and 61B (for pieces 45 and 45A). The angles 44 and 45 are bolted firmly to the horizontal tool bar 34. Front angle 65 is joined by welding to the 1½" faces of front angles 60A and 61A. The rear angle 66 is welded to the 1½" faces of angles 60B and 61B. The tops of the angles 65 and 66 are 6" about the bottom of the bases 44 and 45. The elements 44, 44A, 45, 45A, 60A, 60B, 61A, 61B, 65, 66, 68 and 69 are welded together to form an extremely rigid solid structure, which is firmly and rigidly bolted to and supported on the center and top of the tool bar 34. Steel pivot pins 53 and 55 are of ½" diameter and are located 1" above the bottom of the bases 44 and 45. The centers of these pivot pins are spaced 26½" away from each other in the particular preferred embodiment herein described.

This construction provides in the preferred embodiment between the angles 65 and 66 a 1¾" wide 23½" long latch arm space, 67. At the center of the latch arm space is a cam zone space, 47. Connector plates 68 and 69, each ¼" thick and 2½" wide, separate this central cam space 47 from the remainder of the latch arm space 67. The top surfaces of both plates 68 and 69 are sloped downwardly and outwardly at 15° from the horizontal. The central edges thereof, 68A and 69A, respectively, are spaced 4" away from each other at the same vertical level and at the level of the top of the angles 65 and 66. The space between central edges 68A and 69A is the cam zone space 47.

The left control arm sub-assembly 52 comprises a 31" long steel control arm, 40, and a left latch arm, 70, pivotally is connected thereto. The control arm 40 is composed of a 31" long, 2" wide and 3/8" thick steel arm, 40A, a steel truss piece, 40B, 20" long, 2" wide and 3/8" thick and a flat steel strap, 40C, or 2" wide, 3/8" steel. The 2" surface of arms 40A and 40B are spaced apart ¼" and parallel to each other except that the end of arm 40B is bent towards arm 40A and welded thereto at its outer end. Arms 40A and 40B are welded to the upper surface of strap 40C. A 4-inch long ½" I.D. steel pipe 40D is welded to the bottom of bracket 40C. A ½" O.D. steel bolt 53 passes through lumen of pipe 40D and has its center 1" above the bottom of feet 60A and 60B. Pipe 40D and arm 40 thus smoothly rotate about the pivot bolt 53. Bolt 53 is threaded at its ends and held firmly in position by end nuts. Latch arm 70 is pivotally connected to a cylindrical pivot bolt 72 which passes through arms 40A and 40B and is held in position by nuts on the outside of said arms. The pin 72 is firmly supported in the arms 40A and 40B with its center 5" above the center of bolt or pivot pin 53 in the position shown in FIGURE 6. The right control arm sub-assembly 54 comprises a 31" long, 2" wide and 3/8" thick steel control arm, 41 and a right latch arm 71 pivotally connected thereto by a pivot pin, 73, which is located with its center 5" above the center of pin 55 in the position shown in FIGURE 6. The sub-assembly 53 is composed of components 41A, 41B, 41C, 41D, 41E, 53, 71, and 73 of the same structure and relation as above described for the corresponding components 40A, 40B, 40C, 40D and 40E, 55, 70 and 72, respectively, except for the sub-assemblies 52 and 53 are arranged with arms 70 and 71 extending towards each other.

The latch arm 70 is 14" long and made of 1½" x ¼" steel. The arm 70 extends 13¼" from the center of pin 72 in the preferred embodiment to directly above the center of shaft 84 in the position of components shown in FIGURE 6. A locking plate, 78, 3½" long and formed of 3/8" square steel stock is firmly attached by welding to the bottom of arm 70 and extends 1½" therebeyond. The last 1½" of that plate extends down at an angle of 15° to the central portions thereof. Latch arm 71 has corresponding dimensions and relations, is pivoted on pin 73 and has a similar locking plate 79. The locking plate 78 rests on the top of the sloped connector plate 68. The locking plate 79 rests on the top of the sloped connector plate 69. But for the positions of the cams 86 and 88 on the cam shaft 84 both locking plates may fit into the cam space 47.

The cam sub-assembly 80 is composed of a 4" long arm, 82, continuous with and extending at right angles from a ½" diameter, 5" long, straight cylindrical shaft, 84, with cam plates 86 and 88 firmly fixed onto the shaft generally as shown in FIGURES 12 to 24. Rear cam plate 86 is adjacent to the rear angle 65 and has its rear edge slightly (1/8") spaced therefrom so that the angle does not inhibit the motion of that cam. A front cam plate 88 has its front edge slightly (1/8") spaced from the front angle 66 so that said angle does not interfere with the motion of that cam. Each cam plate is 1½" long, ¾" wide and ¼" thick. The plates 86 and 88 are firmly attached by welding at diametrically opposite parallel lines along the outer surface of the cylindrical cam shaft 84. Each plate extends 1½" perpendicularly to said line; their central edges are co-planar and normal to the central longitudinal axis of shaft 84.

Figure 23:
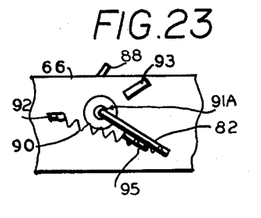
FIGURE 23 is a diagrammatic view along the direction of arrow 15A of FIGURE 7 in the position of component parts shown in FIGURES 20, 21 and 22.
Figure 24:
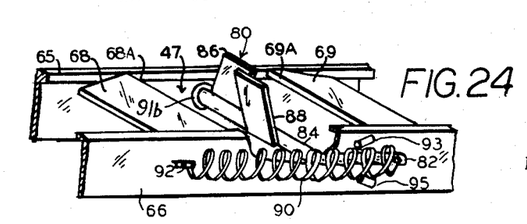
FIGURE 24 is a diagrammatic perspective view of cam sub-assembly 80 with the base 50 shown broken away in part.
Figure 25:
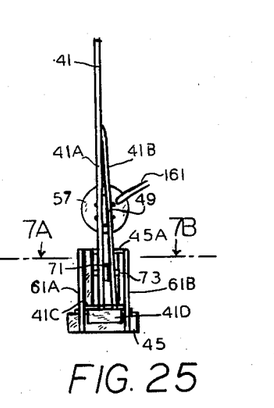
FIGURE 25 is a side view of the apparatus of FIGURE 6 along the direction of the arrow 25A of FIGURE 7.

A snap-over spring 90 is connected by a spring holding plate 92 firmly welded to the outer surface of front angle 66. The snap-over spring urges the arm 82 into one position as in FIGURE 15 or into another as shown in FIGURE 23.

The cam shaft 84 fits into holes or bearings therefor as 91A and 91B in the support angles 65 and 66, respectively. These holes or bearings, in the preferred embodiment, are located with their centers 1" below the top of said angles. The shaft may rotate only within the confines of the 90° angle provided for the movement of its arm 82 by the limit lugs 93 and 95. These lugs 93 and 95 are firmly welded to the outer side of the angle 66 with the lower edge of lug 93 and the upper edge of lug 95 positioned adjacent the position of the upper and lower edges respectively of arm 82 when its central longitudinal axis is at an angle of 45° above or below the horizontal respectively. The motions of the cam plates 86 and 88 and the above-described elements relative to connector plates 68 and 69 and cam space 47 are diagrammatically shown in FIGURES 12 to 23.

The hydraulic sub-assembly 56 comprises a single hydraulic cylinder 57 with a closure plate 157 at one end and a piston rod packing 159 at the other, a piston 58 which smoothly fits into the cylinder 57 and a rod 59 which is firmly attached to the piston 58 and makes slidable and fluid tight contact with packing 159 and extends outwards of the cylinder in the most inwardly retracted (leftward in FIGURES 6–11) position of the piston 58. In the preferred embodiment herein particularly described the piston 58 and rod 59 have a movement or stroke of 8 inches.

A ¼" thick steel web plate 48 is firmly fixed between and attached to the arms 40A and 40B; a similar web plate 49 is firmly fixed between and attached to the arms 41A and 41B, each web plate 48 and 49 being provided with a 1" long, 1" internal diameter pivot sleeve 98 and 99, respectively.

The outer (right hand in FIGURES 6–11) end of rod 59 and the closed (left hand in FIGURES 6–11) end of cylinder 57 are each provided with bearing pins 97 and 96 respectively, firmly affixed thereto, as by welding: These pins smoothly yet rotatably fit in sleeves 99 and 98 respectively for a smooth motion of the arms 40 and 41 inward and outward according to the contraction and extension respectively of the hydraulic sub-assembly 56. The sleeves 98 and 99 have their centers 12" above pins 53 and 55, respectively, in the preferred embodiment in the position shown in FIGURE 6.

The hydraulic sub-assembly 56 is thus firmly yet pivotally attached at its ends (pins 96 and 97) to the arms 40 and 41. The sleeves 98 and 99 firmly support the cylinder 57. The hydraulic lines 160 and 161 are attached to the cylinder 57 at either end thereof and to the hydraulic control valve 153 in control panel 154. A conventional power take-off on the tractor 36 actuates a pump operating in a fluid reservoir 156 to supply hydraulic fluid under pressure to the control valve 153.

The marking assemblies 32 and 33 are joined by adjustable steel chains, 134 and 135, respectively, to the outer end of the adjacent arm—40 and 41 respectively— of the control sub-assembly 31 so that the marking assemblies 32 and 33 will be vertical when the arms 40 and 41 are vertical on maximum retraction of piston arm 59 in cylinder 57 and horizontal at maximum extension of the hydraulic sub-assembly 56.

Each marking sub-assembly, as 32, is formed of a fixed detent sub-assembly, 100, and a pivotal arm sub-assembly, 102, and a marking element sub-assembly, 104. Assemblies as 100 and 102 are joined at a pivot joint as 106. The marking sub-assembly, 104, is movable along the length of arm 122.

The fixed detent sub-assembly comprises a 3 foot high vertical steel post 108 of 2" square steel tubing with upper and lower clamping elements 110A and 110B at the bottom thereof for firm attachment, as by bolts 111A and 111B, to the left side of the tool bar 34.

The pivotal arm sub-assembly 102 comprises a 9 foot long beam 122 of 1½" square steel tubing, a support truss therefor, 124, a pivot bearing sleeve 115, a pivot bolt, 116, and a link, 130.

The post 108 has a rearwardly projecting steel detent arm 118 at its upper end for engagement with the arm 122 of the pivotal arm sub-assembly 102. The lower clamping member 110B supports a 2½" x 2½" horizontal steel angle 112 to which is firmly welded a 17" long, 1¼" I.D. cylindrical pipe 114 which serves as a socket for a horizontally extending 17¼" long, 1¼" O.D., ⅝" I.D. cylindrical pipe 115 which serves as a bearing sleeve, and a 20" long, ⅝" O.D. pivot bolt 116 to which the beams 122 and truss 124 are bolted. Sleeve 115 rotates with sub-assembly 102 and is firmly yet rotatably held within pipe 114. The members enclosed by and contacting pipe 114 and bolt 116 comprise joint 106.

The U-shaped link 130 is pivotally attached to beam 122 by a pivot pin 132 fixedly located on arm 122 16" from the pivot bolt 116. The outer end of the link is firmly attached to one end of chain 134; the other end of the chain is firmly attached to the outer and upper tip 128 of the left control arm 40. The chain 134 is short enough to support arm 123 vertical in the position of FIGURES 4 and 5 and long enough to be loose in the position of parts shown in FIGURE 3. The truss 124 is firmly bolted to the threaded front end of pivot bolt 116. The outer end 125 of the truss is firmly attached to the beam 122 by a bolt and nut.

The marking sub-assembly 104 comprises a clamp 136 which may be slid along the length of beam 122 to any desired position and which clamp is fixed, as by a screw 137, in any desired position along said beam. A downwardly extending shaft 140 (in position shown in FIGURE 3) is firmly attached to the clamp 136 and firmly holds a pointed triangular land marker plate, 142, made of ¼" steel plate, which plate is welded at an angle of 45° to shaft 140. The truss 124 provides for rigidity along the direction of travel of the tractor and plow during the land marking operation as shown in FIGURES 3 and 5 and prevents damage to the bar or beam 122 by bending thereof.

The right-hand marking sub-assembly is a mirror image of sub-assembly 32. It comprises a pivotal beam 123 on which is adjustably positioned a marking sub-assembly 105 and marking plate 143 as above discussed for the sub-assembly 104 of sub-assembly 32. In this case the link 131 for the right-hand sub-assembly 123 is attached by a chain 135, corresponding to chain 134 in function and structures, to the tip 129 of the right-hand control element 41. The beam 123 is provided with a post 109 corresponding in structure, size and method of attachment to the tool bar 34 as above described for the post 108.

In the preferred embodiment arm 122 is extended horizontally when the length of arm 40 is at 40° to the horizontal, as in FIGURE 3. In the preferred embodiment arm 123 is fully extended when arm 41 is at 40° to the horizontal as in FIGURE 5. In the position shown in FIGURES 3 and 5, the hydraulic sub-assembly is extended to its maximum length.

Figure 13:
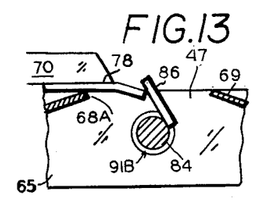
FIGURE 13 is a diagrammatic sectional view of zone 12A along the section line A–B of FIGURE 12.
Figure 17:
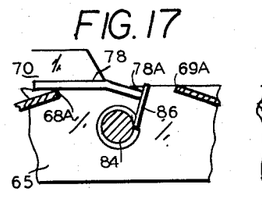
FIGURE 17 is a diagrammatic vertical sectional view along the section A–B of FIGURE 16.
Figure 21:
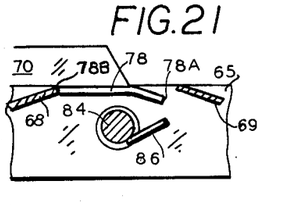
FIGURE 21 is a diagrammatic vertical sectional view along the section A–B of FIGURE 20.

Maximum contraction of sub-assembly 56 occurs on maximum retraction of piston 58 and rod 59 into cylinder 57. Thereupon both arms 40 and 41 are brought to the vertical position shown in FIGURES 4 and 6 from the positions shown in FIGURES 5 and 8 or 3 and 11. When the outer tip 128 of arm 40 is brought inwards from the position of FIGURES 10 and 11, the locking plate 78 of the latch arm 70 initially slidably rests on the top surface of connector plate 68. As shown in FIGURES 13 and 17, the front tip or edge 78A of plate 78 moves to engage the upwardly projecting tip of the cam 86 when arm 40 is at more than 45° from the horizontal. In the preferred embodiment, this tip projects ½" above the top of the plate 65 and 66 as well as above the edge 68A. The force of the cylinder 57 on retraction of rod 59 then overcomes the tension of the spring 90, which tension tends to maintain the cam shaft 84 in position shown in FIGURE 15. Further retraction of rod 59 then moves the cam 86 clockwise as successively shown in FIGURES 13, 17 and 21 until locking plate 78 falls into the space 47 between the plates 68 and 69 as shown in FIGURE 21. This brings the rear edge 78B of the locking element 78 into locking engagement with the central or front edge 68A of the sloped connector plate 68. The plate 78 is 3½" long and thereby extends across most but not all of the space between edges 69A and 68A. As shown in FIGURE 21, the locking plate 78 then is supported by the engagement of edge 68A and arm 70 and is located above the cam 86.

Figure 18:
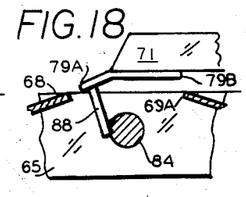
FIGURE 18 is a diagrammatic vertical sectional view along the section C–D of FIGURE 16.
Figure 19:
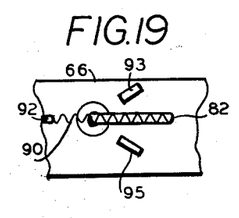
FIGURE 19 is a diagrammatic front view along the direction of arrow 15A of FIGURE 7 in the position of components shown in FIGURES 16 through 18.
Figure 20:
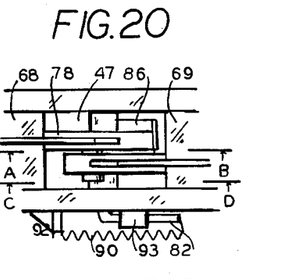
FIGURE 20 is a diagrammatic top view of the zone 20A of FIGURE 7 following clockwise motion of arm 40 to the vertical position of FIGURE 6 from the position of components shown in FIGURES 11 and 16.

The spring 90 snaps the arm 82 in place as shown in FIGURE 23 after sub-assembly 56 has overcome the spring 90 sufficiently to move the cam 86 to the position of the maximum vertical extension of the cam 86 and, also, of the cam 88. As shown in FIGURES 17 and 18, at the time when the cam 86 is almost in its maximum vertical extending position so also is the cam 88. Inasmuch as the cam 88 underlays the plate 79 in the position shown in FIGURE 14, the clockwise motion of the cam 88—forced by the action of sub-assembly 56—serves to raise the link plate 79 prior to that time at which the spring 90 acts to complete the motion of the arm 82. Also prior to that time the force of the powerful hydraulic cylinder acts through the cam 86 and the shaft 84 on the cam 88 to positively and forcefully raise the plate 79 and release that plate from locking engagement with edge 69A by a very strong and positive force. Thereby the spring 90 serves only as a holding spring while the work of lifting the plate 79 is accomplished through the powerful hydraulic sub-assembly 56.

Figure 22:
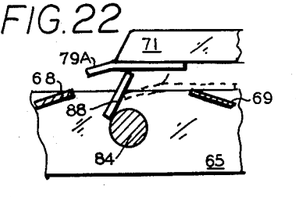
FIGURE 22 is a diagrammatic vertical sectional view along the section C–D of FIGURE 20.

As shown in FIGURES 13, 17 and 21, movement to the right of the latch locking plate 78 causes the cam shaft 84 to rotate into sliding engagement with the lower surface of the locking plate 79 and to move it upward. This rightward motion of the latch arm 70 and its cam 78 against the cam 86 brings the top edge of the cam plate 88 to ½" above the level of edge 68A of the plate 68. The bottom of locking plate 79 is then supported on the upper edge of cam 88 while the plate rear edge 78B then extends above the level of the front or central edge 69A of plate 69. As shown in FIGURES 18 and 22 this motion of the cam 88 and shaft 84 then provides for supporting the latch arm 71 not only at an unlatched and elevated position but also in such a position that such latching arm 71 and the control arm 41 attached thereto may thereafter be freely moved to the right inasmuch as plate 79 is longer than and extends across the space between the edge 69A and the tip of the cam 88, which tip then overlies the center of shaft 84. The cam 88 remains in the position shown in FIGURE 22, i.e. projecting upwardly of the edge 68A, until it is moved counterclockwise as below described.

Accordingly, the apparatus of this invention provides that when one arm, as 40, is brought from its horizontal to the vertical position, it releases the other arm—as 41—from its previously locked position caused by the engagement of the connector plate, as 69, with the locking plate, as 79. When sub-assembly 56 is fully contracted it holds both arms 40 and 41 in the vertical position, while the outer edges of the detents 118 and 119, on the posts 108 and 109, respectively, cooperate with the chains 134 and 135 to maintain the arms 122 and 123 in vertical position. The lateral edges of plates 44A and 45A also contact and help hold arms 40 and 41, respectively, in vertical position.

Figure 14:
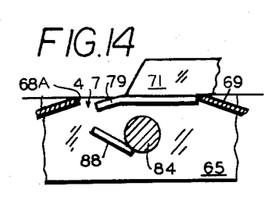
FIGURE 14 is a diagrammatic vertical sectional view taken along section C–D of FIGURE 12.
Figure 15:
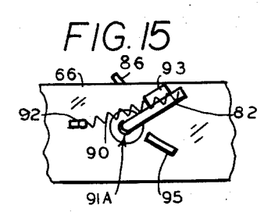
FIGURE 15 is a diagrammatic front view taken along the direction of arrow 15A of FIGURE 7 in the position of components shown in FIGURES 12 through 14.
Figure 16:
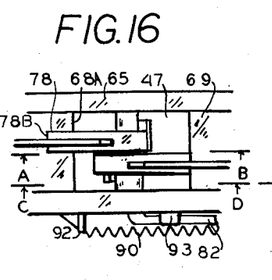
FIGURE 16 is a diagrammatic enlarged top view of the zone 12A of sub-assembly 31 in a position between that of FIGURE 11 and FIGURE 6.

Thereafter, when the hydraulic cylinder sub-assembly 56 is again actuated to extend and push the arms 41 and 40 apart, the arm 40 is then held in place by the rear edge 78B of locking element 78 engaging the central edge 68A of the sloped connector plate 68 as shown in FIGURE 21, and sleeve 98 is fixed and pin 96 rotates therein but does not move laterally. Latch arm 71 of control arm 41 is then not held in place by plate 79 in view of that the locking plate 79 had previously been released from locking engagement with plate 69 as shown in FIGURES 14, 18 and 22. This release of arm 71 permits the arm 59 to move outwards of cylinder 57 and drive the arm 41 downward and outward to positions as shown for the preferred embodiment in FIGURES 8 and 5 and also, according to this invention, with a longer piston arm, 59' and cylinder, 57', to the position shown in FIGURE 9. During this motion the sub-assembly 56 acts as a snubber as well as an actuating member to slowly move the arm 41 and sub-assembly 33 with a minimum of jarring. The piston performs the same snubbing service on slowly raising the arms 122 and 123.

By the apparatus of this invention a locking plate, as 78, on a latch arm, as 70, is provided which is shorter than a cam space 47 bounded by locking shoulders as 68 and 69. However, the locking plate extends sufficiently far across cam space 47 in a direction perpendicular to the axis of rotation of the rotatable cam which it engages so that the outermost edge of said cam which it engages, as 86, is below that plate (78) when that plate 78 is in locking position in that cam space; the rear edge of the plate then operatively engages with and locks on one of the locking shoulders bounding the cam space to prevent outward motion of that plate; subsequently, the rotation of that cam in the opposite direction serves to raise the plate and release it from its engagement with that shoulder.

Figure 6:
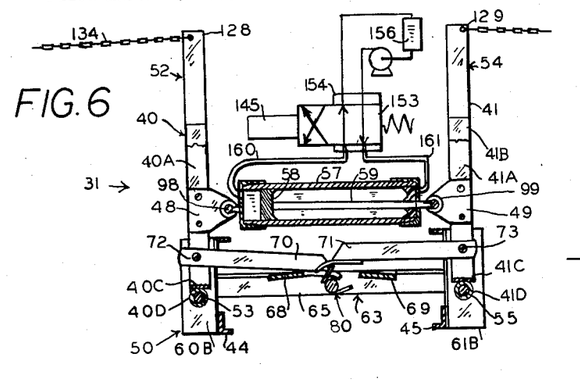
FIGURE 6 is a vertical sectional view along section 6A–6B of FIGURE 7 of the central sub-assembly apparatus of this invention in its neutral position.
Figure 7:
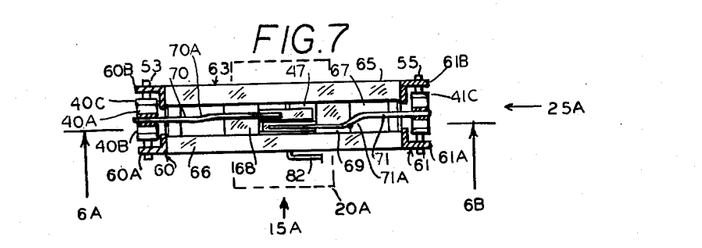
FIGURE 7 is a horizontal view, partly in section, along section 7A–7B of FIGURE 25.
Figure 8:
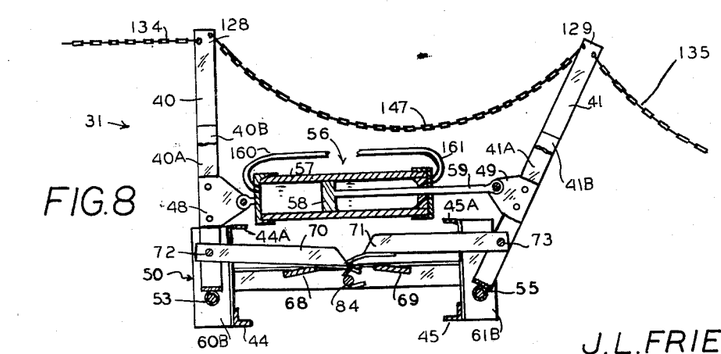
FIGURE 8 is a vertical sectional view taken as in FIGURE 6 when the right arm 41 begins to move to its lowered and extended position from the position shown in FIGURE 6.
Figure 9:
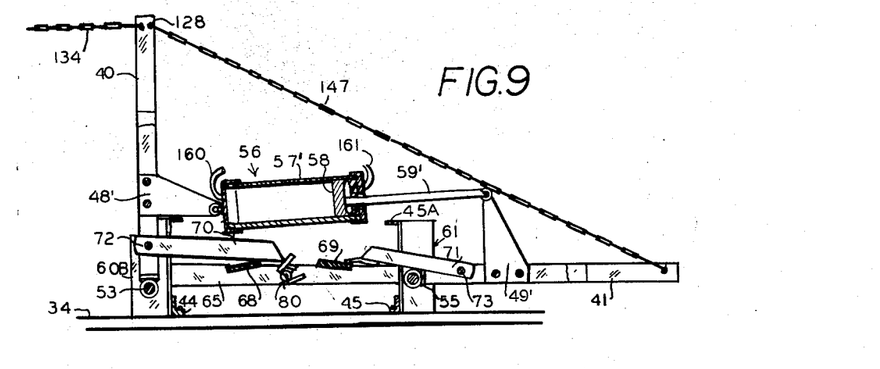
FIGURE 9 is a view taken as in FIGURES 6 and 8 with the right arm (41) fully lowered and extended.
Figure 10:
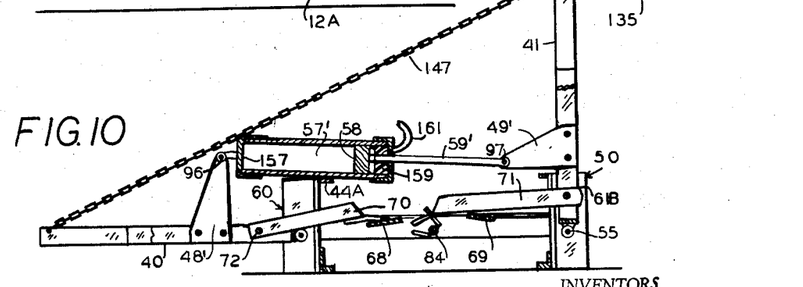
FIGURE 10 is a showing as in FIGURE 6 with the left control arm (40) fully lowered and extended.

After a marking operation with one arm, 40, elevated as shown in FIGURES 5 and 8 or 9, that arm, 40, may also be moved to its lowered and extended position for operation as shown in FIGURES 3 and 10 after first returning the sub-assembly 31 to its neutral position with sub-assembly 56 contracted and with arms 40 and 41 vertical as shown in FIGURES 4 and 6. For this purpose sub-assembly 56 is actuated to retract the piston arm 59 while the contact of detent 118 and arm 122, and the tension on chain 134, attached to arm 122 and tip 128, hold arm 40 vertical, and the contact of arm 40 with plate 44A helps support arm 40 against clockwise rotation and hold bearing 98 in position. This action moves the latch arm 71 leftwards and rotates control arm 41 in a counterclockwise direction from the position shown in FIGURE 9 successively through the positions shown in FIGURE 8 to that shown in FIGURE 6.

Figure 11:
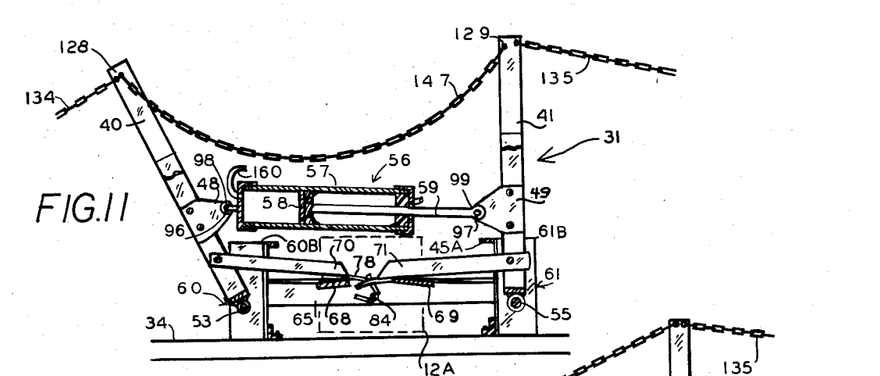
FIGURE 11 is a showing of the device of FIGURE 10 with the left control arm (40) on its way up from the position shown in FIGURE 10.
Figure 12:
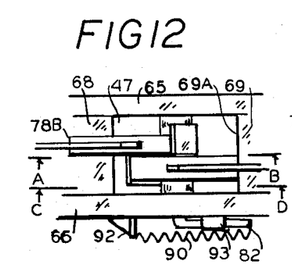
FIGURE 12 is a diagrammatic enlarged top view of the zone 12A of FIGURE 11.

When arm 41 has moved counterclockwise of the position shown in FIGURE 8 the plate 79 of the latch arm sub-assembly 71, as shown by dotted lines in FIGURE 22, engages the cam plate 88 in the same manner as plate 78 engaged cam 86 in the stage in the sequence of steps shown in FIGURE 13; on further contraction of the sub-assembly 56 the cam plate 88 will be moved counterclockwise (in the same manner as is shown for cam 86 in FIGURES 13, 17 and 21 on moving in the clockwise direction): During this further contraction the cam plate 86 will rotate counterclockwise while engaging the underside of the plate 78 from the position shown in FIGURE 21 and raise the plate 78 to a level ½" above that of the edge 68A (in the same general manner that the cam 88 raised the plate 79 ½" above the edge 69A as shown in FIGURES 14, 18 and 22). This releases the rear edge of plate 78 from its locking engagement with the locking edge of plate 68 and leaves the latch arm sub-assembly 70 free to be moved to the left of plate 68 so that the arm 40 may be rotated counterclockwise to the position as shown in FIGURE 11 on the usual extension of rod 59 from cylinder 57. Use of a longer extension of rod 59 and use of a plate 48' longer than plate 48 provides for extension of arm 40 to the position shown in FIGURE 10: the longer plate 48' permits piston 57 to then clear sub-assembly 60. The longer plate 49' permits arm 59 to clear assembly 61 in the position of parts shown in FIGURE 9. During the extensions of assembly 122, the arm 41 and pivot sleeve 99 are stationary; extension of the sub-assembly 56 then moves the cylinder 57, which is pivotally attached by pin 96 and sleeve 98 to the then movable arms 40 and 70. The above-described motion puts the arm 122 and land marking plate 142 in the position shown in FIGURE 3. Thereafter, by retraction of the pistion arm 59 into the hydraulic sub-assembly 56, arms 40 and 41 may be brought again to the vertical position as shown in FIGURE 6 and thence, as desired by the operator, to the position shown in FIGURES 5 and 8 and the cycle of alternate movement of the marking assemblies from the operative land marking positions on left to the operative land marking position right of the tractor and vice versa, passing through the stable neutral position in each case, repeated as above described. Longer plate 49' permits arm 59 to clear 61 in FIGURE 9.

The distance from pin 53 to pin 72 is less than the sum of the length of plate 78 and width of plate 68. Thereby the plate 78 of arm 70 does not lose contact with the plate 68 even in the extended position of arm 40 shown in FIGURES 3, 10 or 11. The distance from pin 55 to pin 73 is less than the sum of the length of plate 79 and width of plate 69: thereby the plate 79 of arm 71 does not lose contact with the plate 69 even in the extended position of arm 41 shown in FIGURES 9 and 5.

There is a very undesirable situation if land marking sub-assemblies are left in their extended positions while a tractor-plow combination is attempted to be turned. By the device of this invention, when turning a tractor and plow combination, both marking sub-assemblies as 32 and 33 are readily moved to the vertical position as shown in FIGURE 4. Thereafter, on completing a turn to the right, according to the operation of this device, only the left land marking sub-assembly, 32, will extend in its lowered position with the land marker plate 142 operative inasmuch as the marking sub-assembly 33 is locked against outward movement as above described. Subsequently, on completing a 180° turn to the left, the right-hand land marking plate 143 and sub-assembly 33 will be operative. Accordingly, by this invention only one land marking sub-assembly or the other may be extended, and each becomes operative in proper sequence as well as brought to the vertical position for turning. The only operation necessary on the part of the operator to make an arm as 40 or 41 and its corresponding marking sub-assembly as 32 or 33 come to its operative land-marking position is that the operator touch the usual hydraulic valve control arm or button 145 on the tractor to actuate the standard hydraulic valve 153 and cylinder 57 and so control the movement of the sub-assembly 56 to extend or retract the piston arm 59, as desired.

The angle of turning of the cam shaft 84 permitted by arm 82 and lugs 93 and 95 provides that, in the position shown in FIGURE 21 where the plates 78 and 68 are in locking engagement, cam 86 is held spaced away by spring 90 from plate 78, the bottom surface of which plate it later raises in the same manner as cam 88 raises plate 79, shown in FIGURES 14, 18, and 22. Similarly, the cam 88 is drawn by spring 90 out of contact with plate 79 in the engaged position of plates 79 and 69 (FIGURE 14). This positive spacing apart by ⅛″ to ¼″ of the cam and associated locking plate element by spring 90 avoids any accidental release of the latch plates 78 and 79 from the plates 68 and 69 in their intended latched positions. The edges 68A, 69A, 78B, and 79B are vertical and flat (the angles 65, 66, and bar 34 being horizontal relative thereto) for purposes of positive engagement.

A chain 147 between arm ends 128 and 129 limits the distance between said ends so that the plates 78 and 79 do not lose contact with plates 68 and 69 when plates as 68 and 69 of narrower width than those particular ones above described are used and/or it is desired to limit the minimum angle of arms 40 and 41 to the horizontal. The arms 70 and 71 are slightly bent (FIGURE 7) at 70A and 71A, respectively, to provide that arms 70 and 71 be perpendicular to pins 72 and 73, respectively, near those pins yet that plate 78 be close to yet out of contact with the rear angle 65 and plate 79 be similarly spaced from the front angle 66. The bolt as 72 is adjustable and may be tightened to utilize the alignment provided by the adjacent flat surfaces of arms 40A and 40B on the flat surface of arm 70 and so keep its plate 78 positioned and oriented properly in the space 47. Bolt 73 may be similarly tightened on arms 41A and 41B to keep arm 71 and its plate 79 properly positioned and oriented in space 47.

The firm yet rotatable fit of the pivot 106 for sub-assembly 32 in combination with its triangular truss structure and the corresponding pivot for sub-assembly 33 and its truss structure minimizes rattling in those sub-assemblies. Firm attachment of both those sub-assemblies is provided as above described, to the conventional 17 foot long bar 34 of 2½″ solid square 1055 type steel in the particular preferred embodiment above described; thereby the damping effect of the tools as 37A, 37B, 37C, 37D, 37E (which are firmly attached to said tool bar) on any such forward and backward vibration of sub-assemblies 32 and 33, especially when those tools contact the ground, serves to isolate the control sub-assembly from any forward and backward vibration of the sub-assemblies 32 and 33. The chains 134 and 135 are, as shown in FIGURES 3 and 5, loose when the associated marking elements, as 142 and 143, respectively, are operative. This serves to isolate the control sub-assembly 31 from transmission of up and down vibration and twisting motion of the sub-assemblies 32 and 33. This isolation of the control sub-assembly from rattling and vibration effects that might result from the contact of the marking sub-assembly and the ground minimizes any accidental transmission of vibration to the control assembly that might release a member intended to be latched.

This looseness of chains 134 and 135 effects and achieves this isolation because, although those chain members are capable of supporting tension stresses and are thus tension support members, they are, according to the arrangement of apparatus of this invention, also flexible when they are loose, as in the operations shown in FIGURES 3 and 5, and so transmit a minimum of transverse longitudinal and twisting motion.

The length of cam 86 (and 88) is greater than the distance from center of shaft 84 below edge 68A (and 69A) to raise plate 78 (and 79) above that edge, but the distance from center of shaft 84 to outer tip of cam 86 (and 88) is less than the distance from said center to edge 78A (and 79A) when it is locked on edge 68A (and 69A) so that cam 86 (and 88) will engage the underside of plate 78 (and 79 respectively) for unlocking thereof.

Arms 122 and 123 are, in the particular embodiment above described, nine (9) feet long but need be long enough only to support the land marking devices, as 142 and 143, thereon at a distance from the center line of the tractor that is the distance between intended adjacent parallel paths of the tractor 36. Thus, the land marking devices, as 142 and 143, need be supported at a lateral distance from the nearest end of the tool bar no greater than one-half the length of the tool bar. This combination of tool bar, tool control sub-assembly, as 31, and land marking sub-assemblies as 32 and 33 smoothly pivotably attached to the bar, and flexible tension support means between sub-assemblies as 31, 32 and 31 and 33 of this invention thus utilizes the length and strength of the tool bar as well as the damping effect of the earth working tools attached thereto to provide relatively short pivoted sub-assemblies (32 and 33): The relatively short lengths of such sub-assemblies further reduce formation of undesirable vibration thereof while the remainder of the structure of this invention also reduces undesirable transmission of such vibration to the control sub-assembly and the tractor.

In the embodiment shown in FIGURES 9 and 10, chamber of cylinder 57 is made longer relative to sub-assembly 63 and sub-assembly 63 is also made absolutely longer than above described for the apparatus of FIGURES 6, 8, and 11; i.e. the distance between the pivot pins 53 and 55 is preferably increased in FIGURES 9 and 11 from 26½ to 38¼ inches: also, the stroke of the piston 58 and rod 59 is then chosen to be 16 inches (rather than 8 as above described for FIGURES 6, 8, and 11) to permit the arms 40 and 41 to be horizontal or vertical as above described in relation to FIGURES 9 and 10 at pages 18 and 19 hereinabove while, thereby, still maintaining the relationships of the arms 70 and 71 and their locking plates as above described and shown in FIGURES 12 through 23.

Although, in accordance with the provision of the patent statutes, a particular presently preferred embodiment of this invention has been described in detail and the principles of the invention have been described in the best mode in which it is now contemplated applying such principles, it will be understood that the constructions shown and described herein are merely illustrative and that the invention is not limited thereto and, accordingly, alterations and modifications which readily suggest themselves to persons skilled in the art without departing from the true spirit of the disclosure hereinabove are intended to be included in the scope of the annexed claims.

We claim:

1. In combination with a tractor having a transversely extending tool bar attached thereto, and earth working tools attached thereto, a marking device comprising a control subassembly and two land marking subassemblies, said land marking subassemblies being supported at the opposite ends of said tool bar, said tool bar extending laterally of the sides of said tractor, each of said marking subassemblies being pivotally attached at one end to said tool bar and there rotatable about an axis perpendicular to the length of said tool bar, tension supporting means connecting said control subassembly to said marking subassemblies, said marking subassemblies each comprising a rigid elongated member supporting near its outer end a land marking device, stop means for engaging said marking subassembly attached to said tool bar, said control subassembly being attached to said tool bar, said control subassembly comprising a base and a pair of control arms each attached by pivot means at either side of said base to said base for rotation of each of said control arms about a horizontal axis parallel to the axis of rotation of said marking subassembly, in predetermined sequence of one, then both, then the other control arm being held in a vertical position, extensible and retractable means continuously connected at one end to one control arm and at another end to the other control arm, said extensible and retractable means being operatively connected to a source of power driven by said tractor and each of said control arms being pivotally connected to one of a plurality of latch arm means, a fixed latch arm holding means for each of the control arms supported on and attached to said base and serving to limit the motion of one latch arm means and the control arm connected thereto in one direction, and, for each of the control arms, another means fixedly attached to said base and serving to limit the motion of said same control arm in the other direction, each latch arm means alternately serving to hold on to one of said fixed latch arm holding means supported on said base and limit the motion of said one latch arm in one direction while said another means fixedly attached to said base limits the motion of said same control arm in the other direction, said latch arm means each traveling in a path that does not overlap the path of the other latch arm means, and movable latch arm releasing means rotatably attached to and supported on said base and alternately actuated by each one of said latch arm means.

2. In combination with a tractor having a transversely extending tool bar attached thereto, a marking device comprising a control subassembly and two land marking subassemblies, said land marking subassemblies being supported at the opposite ends of said tool bar, said tool bar extending laterally of the sides of said tractor, one central end of each of said marking subassemblies being pivotally attached to said tool bar and rotatable about a horizontal axis perpendicular to the length of said tool bar, flexible tension supporting means connecting said control subassembly to said land marking subassemblies, said land marking subassemblies each comprising a rigid elongated member supporting near its other, lateral, end a land marking device, said land marking subassemblies being pivotally attached to said tool bar, and the said control subassembly being attached to and supported on said tool bar, said control subassembly comprising a rigid base and a pair of control arms each attached at one end thereof by pivot means at either side of said base to said base to bear a laterally and outwardly directed tensile force at their other end and for rotation of each of said arms about an axis parallel to the axis of rotation of said marking subassembly, and to rotate each of said control arms and marking subassemblies in predetermined automatic repeated sequence of one, then both, then the other of said control arms being held in a vertical position, said base comprising a transversely elongated rigid frame and latch arm detent plates each supported on said frame and extending thereacross, each at the same distance from said pivot means, for attachment of said control arms to said base and a space elongated in the direction of the length of said base between said latch arm detent plates, said control arms being operatively connected to each other by extensible and retractable means, said extensible and retractable means being operatively connected to means mounted on said tractor for increasing and decreasing the length of said extensible and retractable means, each of said control arms having pivotally supported thereon a latch arm, each said latch arm extending from one end thereof supported on a pivot on said control arm to the said base a tensile stress across the control arms being alternately borne by one latch arm and the extensible and retractable means, said extensible and retractable means being located above said latch arms and in the upward path of motion thereof thereby providing a positive limit to the upward motion of said latch arms, there being attached to the other end of each of said latch arms a downwardly extending latch arm locking means for engagement with a latch arm detent plate, each of said latch arm locking means moving in non-overlapping zones, a camshaft rotatably supported on said base between said latch arm detent plates and extending transverse to the length of said base, a plurality of cams on said rotatable camshaft each extending perpendicular to the length of said camshaft, and at an angle to each other, one end of each of said latch arms being supported on one of its ends on an end of one of the cams on said camshaft while the other of said latch arms then latchedly attaches on one of the detent plates, elastic means attached to and urging said camshaft into one or the other of a plurality of alternate positions, one of said latch arms contacting one cam on said camshaft and moving said camshaft after the extensible and retractable means has assumed the tensile stress between said control arms, and another of said cams on said camshaft then contacting and releasing the other of the two latch arms from its latched attachment to a latch arm detent plate.

3. In combination with a tractor having a transversely extending tool bar attached thereto, and earth working tools attached to said bar, a marking device comprising a control subassembly and two land marking subassemblies, said land marking subassemblies being supported at the opposite ends of said tool bar, said tool bar extending laterally of the sides of said tractor, each land marking subassembly comprising a rigid elongated member pivotally attached at one, central, end thereof to said tool bar and supporting a land marking device near its other peripheral end and rotatable from a vertical to a horizontally extended position about a horizontal axis perpendicular to the length of said tool bar, flexible tension supporting means connecting said control subassembly to an outer portion of each of said land marking means subassemblies; and stop means for engaging said marking subassembly attached to said tool bar;

said control subassembly being attached to said tool bar, said control subassembly comprising a rigid base and a pair of rigid control arms each pivotally attached at one end thereof by pivot means at either side of said base to said base for rotation of each of said arms about a horizontal axis parallel to the axis of rotation of said marking subassembly in predetermined sequence;

said base comprising a frame comprising two spaced apart transverse members joined near their centers by two spaced apart latch arm detent plates, said detent plates being spaced apart from each other and joined at each of their ends to one of said transverse members, the central portions of said detent plates and adjacent portions of said transverse members forming a rectangular cam space and the lateral portions of each said detent plate extending laterally and downwardly from the central edge of each of said detent plates;

said control arms being operatively connected to each other by extensible and retractable means, said extensible and retractable means being operatively connected to means mounted on said tractor for increasing and decreasing the length of said extensible and retractable means, each of said control arms having pivotally supported thereon a latch arm, each said latch arm extending from a pivot on said control arm to the cam space on said base in the vertical position of said control arm, and there being attached to each of said latch arms a downwardly extending latch arm locking plate of a length less than the length of said cam space, said latch arm locking plate being attached to said latch arm at the same transverse distance from the connection of said latch arm with said control arm as the furthest point from said connection of the central edge of said latch arm detent plate in the vertical position of said control arm; the latch arm locking plates moving in non-overlapping zones, a single camshaft rotatably supported in said transverse base members and transverse of the length thereof and located below and centrally of said cam space, a portion of said cams on said camshaft extending upwardly beyond said cam space and upwardly of the transverse members, means attached to and urging said camshaft into one of a plurality of alternate positions, means on one of said transverse members limiting the motion of said camshaft, cams on said camshaft, the length of each of which cams extend normal to the axis of said shaft and the width of each of which cams extend parallel to said axis, a first one of said cams extending vertically and engaging the bottom surface of a first one of said latch arm locking plates of one of said latch arms and another cam on said camshaft and extending from said camshaft in the same direction as said first cam and below the other latch arm locking plate, said first one of said cams supporting said latching arm locking plate so that a lateral edge thereof is at least as high as the central edge of the adjacent latch arm detent plate, the distance on each control arm between the point of attachment thereof to its latch arm and the pivot means attachment of that control arm to the base being less than the sum of the distances between the central and lateral edges of said latch arm locking plate of said latch arm and the width of the latch arm detent plate, both measured in the same flat plane.

4. Control means comprising a rigid base and a pair of control arms each pivotally attached at one end by pivot means at either side of said base to said base for rotation about parallel axes and to bear a laterally and outwardly directed tensile force at their other end, said base comprising a rigid frame comprising a pair of spaced apart transverse members firmly joined to latch arm detent plates, said detent plates being supported on and attached to said transverse members and extending across the space between said spaced apart members, each detent plate being located at the same distance from the nearer pivot means attaching the nearer control arm to the base, and there being a space extending in the direction of the length of said base between said latch arm detent plates, said control arms being operatively connected to each other by extensible and retractable means, said extensible and retractable means being operatively connected to means for increasing and decreasing the length of said extensible and retractable means, each of said control arms having pivotally supported thereon a latch arm, each said latch arm extending from, at one, outer, end thereof, a pivot on the control arm to which said latch arm is connected to said base, and there being attached at the other, inner, end of each of said latch arms, a downwardly extending latch arm locking means for engagement with a latch arm detent plate, each of said latch arm locking means moving in non-overlapping zones, a camshaft rotatably supported on said base between said latch arm detent plates and with its length transverse to the length of said base, a plurality of cams on said rotatable camshaft each extending perpendicular to the length of said camshaft and at an angle to each other, one end of each of said latch arms being supported at least in part on one of the cams of the camshaft while the other of said latch arms then holds by latching on one of the latch detent plates, elastic means attached to and urging said camshaft into one or the other of a plurality of alternate positions, one of said latch arms contacting one cam on said camshaft and moving said camshaft after the extensible and retractable means has assumed the tensile stress between said control arms, and another of said cams on said camshaft then contacting and releasing the other of the two latch arms from its latched attachment to a latch arm detent plate.

5. Control means comprising a rigid base and a pair of rigid control arms each pivotally attached by pivot means at either side of said base to said base for rotation about parallel axes, said base comprising a frame of two spaced apart transverse members joined near their centers by two spaced apart smooth surfaced latch arm detent plates, said detent plates being spaced apart from each other and joined to both of said transverse members, forming a rectangular cam space therebetween and the lateral portions of each of said detent plate extending laterally and downwardly from the central edge of each of said plates, said control arms being operatively connected to each other by extensible and retractable means, said extensible and retractable means being operatively connected to means for increasing and decreasing the length of said extensible and retractable means, each of said control arms having pivotally supported thereon a latch arm, said each latch arm extending from at one, outer, end thereof a pivot on said control arm to the cam space in said base in the vertical position of said control arm and there being attached to each of said latch arms a downwardly extending latch arm locking means of a transverse length less than the transverse length of said cam space, said latch arm locking means being attached to said latch arm at the same transverse distance from the connection of said latch arm with said control arm as the furthest point from said connection of the central edge of said latch arm detent plate in the vertical position of said control arm, each of said latch arms locking means moving in non-overlapping zones, a camshaft rotatably supported in said transverse base members and transverse to the length thereof and located centrally of said cam space, means attached to and urging said camshaft into one or the other of a plurality of alternate positions, means attached to said base limiting the motion of said camshaft, cams on said camshaft the length of each of which cams extends normal to the axis of said camshaft and the width of each of which cams extends parallel to said axis, one of said cams extending vertically and its top engaging the bottom surface of one of said latch arm locking means of one of said latch arms and another cam on said shaft extending from said camshaft below the other latch arm locking means said first one of said cams supporting said latch arm locking means so that a lateral edge thereof is at least as high as the central edge of the adjacent latch arm detent plate, the distance on each control arm between the point of attachment thereof to its latch arm and the pivot means attachment of that control arm to the base being less than the sum of the distances between the central and lateral edges of said lateral arm locking means of said latch arm and the width of the latch arm detent plate, both measured in the same flat plane.

6. Apparatus as in claim 5 wherein the extensible and retractable means is continuously and directly connected to the control arms and means fixed to the base and in the path of movement of each of the control arms limits the inward motion of each such control arm.

7. Apparatus as in claim 6 wherein the latch arms each travel in a path that does not overlap the path of the other latch arm and the latch arm detent plate of one latch arm lies in the path of and limits the motion theretoward of the other latch arm.

8. Apparatus as in claim 7 wherein there is an outward tensile stress acting on the ends of the control arms distant from the base and, after the extensible and retractable means has assumed the tensile stress between the control arms, the camshaft is alternately actuated by one of said latch arms and releases the other of said latch arms theretofore held in position and the extensible and retractable means is located between the control arms and is located above said latch arms and in the path of upward motion thereof, thereby providing a positive limit to the upward motion of said latch arms.

References Cited in the file of this patent

UNITED STATES PATENTS

| | | |
|---|---|---|
| 1,932,107 | Hipple | Oct. 24, 1933 |
| 2,618,214 | Ball | Nov. 18, 1952 |
| 2,827,843 | Tea | Mar. 25, 1958 |
| 2,975,841 | Oehler et al. | Mar. 21, 1961 |

FOREIGN PATENTS

| | | |
|---|---|---|
| 1,020,474 | Germany | Dec. 5, 1957 |
| 710,810 | Great Britain | June 16, 1954 |
| 769,320 | Great Britain | Mar. 6, 1957 |